(12) United States Patent
Chen et al.

(10) Patent No.: US 10,853,433 B2
(45) Date of Patent: Dec. 1, 2020

(54) METHOD AND DEVICE FOR GENERATING BRIEFING

(71) Applicant: BEIJING BAIDU NETCOM SCIENCE AND TECHNOLOGY CO., LTD., Beijing (CN)

(72) Inventors: Sijiao Chen, Beijing (CN); Yu Luo, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 174 days.

(21) Appl. No.: 16/163,502

(22) Filed: Oct. 17, 2018

(65) Prior Publication Data

US 2019/0188329 A1   Jun. 20, 2019

(30) Foreign Application Priority Data

Dec. 15, 2017 (CN) .......................... 2017 1 1350426

(51) Int. Cl.
| | |
|---|---|
| G06F 16/9535 | (2019.01) |
| G06F 16/35 | (2019.01) |
| G06F 16/34 | (2019.01) |
| G06Q 10/10 | (2012.01) |
| G06F 40/30 | (2020.01) |
| G10L 13/00 | (2006.01) |

(52) U.S. Cl.
CPC ........ G06F 16/9535 (2019.01); G06F 16/345 (2019.01); G06F 16/35 (2019.01); G06F 40/30 (2020.01); G06Q 10/10 (2013.01); G10L 13/00 (2013.01)

(58) Field of Classification Search
USPC ......................................................... 707/736
See application file for complete search history.

(56) References Cited

U.S. PATENT DOCUMENTS

| | | | |
|---|---|---|---|
| 9,576,009 B1* | 2/2017 | Hammond | G06Q 10/10 |
| 2005/0238238 A1* | 10/2005 | Xu | G06F 16/7834 382/224 |
| 2010/0070448 A1* | 3/2010 | Omoigui | H01L 27/14647 706/47 |
| 2012/0197630 A1* | 8/2012 | Lyons | G06F 16/345 704/9 |
| 2012/0254188 A1* | 10/2012 | Koperski | G06F 16/9535 707/740 |
| 2013/0346349 A1* | 12/2013 | Gross | G06F 16/9535 706/12 |
| 2014/0372425 A1* | 12/2014 | Ayoub | G06F 16/9535 707/727 |
| 2015/0058428 A1* | 2/2015 | Caskey | H04L 51/02 709/206 |

(Continued)

*Primary Examiner* — Hosain T Alam
*Assistant Examiner* — Nicholas E Allen
(74) *Attorney, Agent, or Firm* — Lathrop GPM LLP

(57) ABSTRACT

The present disclosure provides a method and a device for generating a briefing, the method includes: determining a target news category of a user according to historical accessing data of the user; matching the target news category with a preset event map, to obtain a plurality of pieces of news related to the target news category; extracting a news abstract from each news, to obtain a plurality of news abstracts; selecting a part of news abstracts from the plurality of news abstracts, and generating the briefing based on the part of news abstracts.

15 Claims, 3 Drawing Sheets

(56) References Cited

U.S. PATENT DOCUMENTS

| | | | |
|---|---|---|---|
| 2015/0073895 A1* | 3/2015 | Karnin | H04L 51/22 |
| | | | 705/14.49 |
| 2015/0193540 A1* | 7/2015 | Wexler | G06F 16/9535 |
| | | | 707/734 |
| 2015/0268922 A1* | 9/2015 | Defouw | H04N 21/26258 |
| | | | 715/716 |
| 2016/0014482 A1* | 1/2016 | Chen | H04N 21/26258 |
| | | | 386/241 |
| 2016/0034540 A1* | 2/2016 | Xian | G06F 16/24578 |
| | | | 707/706 |
| 2016/0232241 A1* | 8/2016 | Stoyanov | G06F 16/9535 |
| 2017/0124061 A1* | 5/2017 | Amerige | G06F 40/197 |
| 2017/0213130 A1* | 7/2017 | Khatri | G06N 3/0445 |
| 2017/0228369 A1* | 8/2017 | Zelenkov | G06F 40/30 |
| 2017/0235820 A1* | 8/2017 | Conrad | G06F 16/358 |
| | | | 707/728 |

* cited by examiner

METHOD AND DEVICE FOR GENERATING BRIEFING

CROSS-REFERENCE TO RELATED APPLICATIONS

This application is based on and claims priority of Chinese Patent Application No. 201711350426.X, filed on Dec. 15, 2017, the entire contents of which are incorporated herein by reference.

FIELD

The present disclosure relates to a field of Internet technology, and more specifically to a method and a device for generating a briefing.

BACKGROUND

In the age of information overload and abundance, with the explosive growth of news stream content, trending applications and products around news information are receiving an attention. For example, various information-type APPs support personalized information recommendation and pushing of video/image and other forms of multimedia content. However, a user pays more and more for getting interesting high-quality, high-timeliness news. Facing the pushing of a plurality of news content, it is necessary for the user to obtain as much as possible high-quality news content that the user concerns or is interested in within a limited time period.

SUMMARY

The present disclosure aims to solve one of the technical problems in the related art to at least some content.

Accordingly, a first objective of the present disclosure is to provide a method for generating a briefing, which can improve timeliness of news dissemination, satisfy personalized reading needs for a user, and improve user experience and commercial value of related products.

Another objective of the present disclosure is to provide an apparatus for generating a briefing.

Another objective of the present disclosure is to provide a non-transitory computer readable storage medium.

Another objective of the present disclosure is to provide a computer program product.

To achieve the above objectives, a first aspect of embodiments of the present disclosure provides a method for generating a briefing, including: determining a target news category of a user according to historical accessing data of the user; matching the target news category with a preset event map, to obtain a plurality of pieces of news related to the target news category; extracting a news abstract from each news, to obtain a plurality of news abstracts; and selecting a part of news abstracts from the plurality of news abstracts, and generating the briefing based on the part of news abstracts.

To achieve the above objectives, a second aspect of embodiments of the present disclosure provides an apparatus for generating a briefing, including: a determining module, configured to determine a target news category of a user according to historical accessing data of the user; a matching module, configured to match the target news category with a preset event map, to obtain a plurality of pieces of news related to the target news category; an extracting module, configured to extract a news abstract from each news, to obtain a plurality of news abstracts; a generating module, configured to select a part of news abstracts from the plurality of news abstracts and to generate the briefing based on the part of news abstracts.

To achieve the above objectives, a third aspect of embodiments of the present disclosure provides a non-transitory computer readable storage medium. When instructions in the storage medium are executed by a processor of a mobile terminal, the mobile terminal is caused to execute a method for generating a briefing. The method includes: determining a target news category of a user according to historical accessing data of the user; matching the target news category with a preset event map, to obtain a plurality of pieces of news related to the target news category; extracting a news abstract from each news, to obtain a plurality of news abstracts; and selecting a part of news abstracts from the plurality of news abstracts, and generating the briefing based on the part of news abstracts.

To achieve the above objectives, a fourth aspect of embodiments of the present disclosure provides a computer program product. When instructions in the computer program product are executed by a processor, the processor is caused to implement a method for generating a briefing, including: determining a target news category of a user according to historical accessing data of the user; matching the target news category with a preset event map, to obtain a plurality of pieces of news related to the target news category; extracting a news abstract from each news, to obtain a plurality of news abstracts; selecting a part of news abstracts from the plurality of news abstracts, and generating the briefing based on the part of news abstracts.

The partial accompanying aspects and advantages of the present disclosure will be illustrated in the following description, which will be apparently, or be understood by the practice of the present disclosure in the following description.

BRIEF DESCRIPTION OF THE DRAWINGS

The above and/or accompanying aspects and advantages in the present disclosure will be more clearly and easy to understand with reference to the following of the embodiments described the accompanying drawings, in which.

DETAILED DESCRIPTION

Reference will be made in details below to embodiments of the present disclosure, examples of which are illustrated in the accompanying drawings. The same or similar numbers represent the same or similar elements or elements with the same or similar function. Embodiments described below in the following accompanying drawings are exemplary, only for purpose of description of the present disclosure, but not constructed to limit the present disclosure. In contrast, embodiments of the present disclosure include all changes, modifications and equivalents within the spirits and scope of the accompanying claims.

Figure 1:
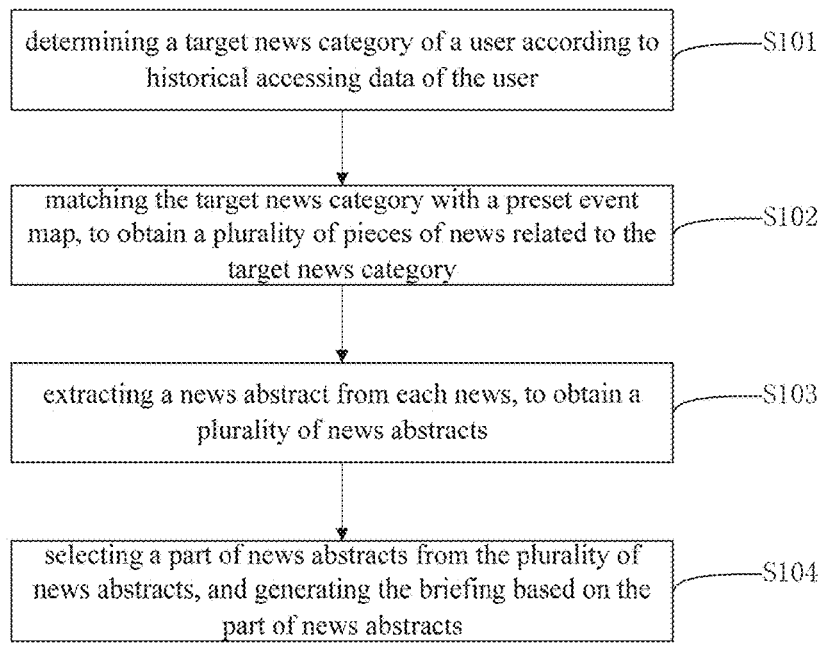
FIG. 1 is a flow chart illustrating a method for generating a briefing provided by an embodiment of the present disclosure.

FIG. 1 is a flow chart illustrating a method for generating a briefing provided by an embodiment of the present disclosure.

In this embodiment, the method for generating the briefing is configured in an apparatus for generating the briefing.

In the embodiment, the apparatus for generating the briefing may be configured in a server, or may be configured in a mobile device, which is not limited herein.

The method for generating the briefing in embodiments of the present disclosure is used for generating a news briefing matched with a user's interest point according to real-time dynamic news broadcasted on Internet, which is not limited.

The mobile device is, for example, a smartphone, or a tablet computer.

It should be noted that, an execution subject of embodiments of the present disclosure may be, for example, a CPU (Central Processing Unit) in the server or in the mobile device from a hardware perspective, or may be, for example, background management service in the server or the mobile device from a software perspective, which will be not limited.

In this embodiment of the present disclosure, the apparatus for generating the briefing is configured in the mobile device.

Referring to FIG. 1, the method includes the following.

At block S101: a target news category of a user is determined according to historical accessing data of the user.

In embodiments of the present disclosure, the target news category of the user may be determined according to the historical accessing data related to news that the user used to access on the Internet when the user launches or logs in to a briefing-generation-type application. The target news category may be specifically the news category matched with the user's interest point, or may be the news category that the user selects from a plurality of preset news categories.

The target news category may be, for example, entertainment, Military or the like.

At block S102: the target news category is matched with a preset event map, to obtain a plurality of pieces of news related to the target news category.

Figure 2:
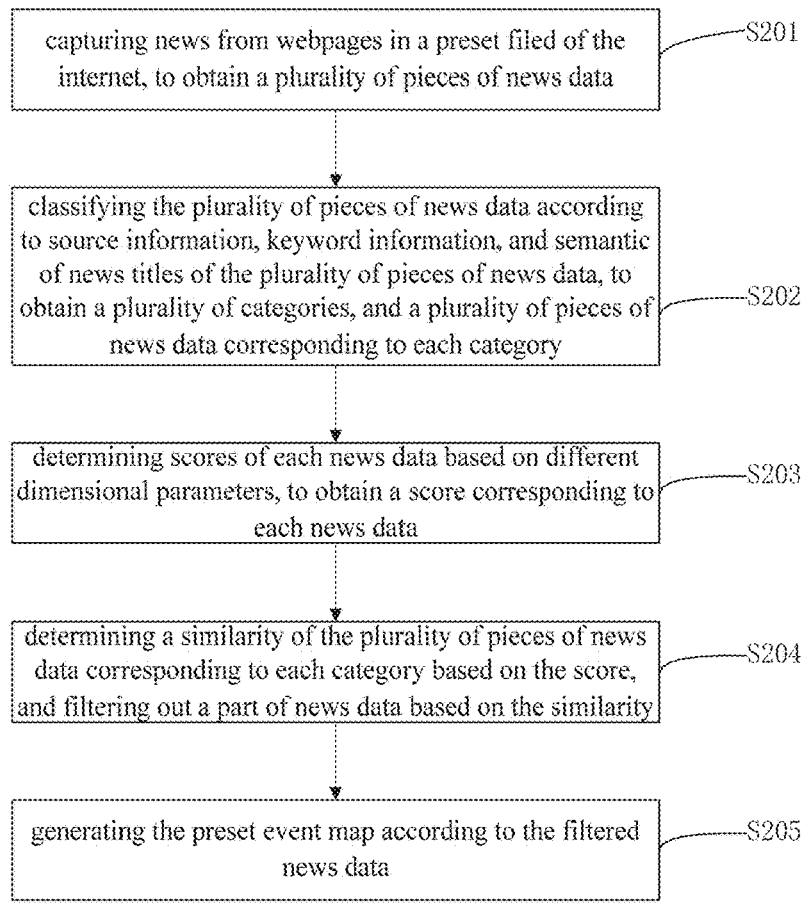
FIG. 2 is a flow chart illustrating a method for generating a briefing provided by another embodiment of the present disclosure.

Alternatively, in some embodiments, referring to FIG. 2, a preset event map may be established by the following operations.

At block S201: news from webpages in a preset field of the Internet is captured, to obtain a plurality of pieces of news data;

In embodiments of the present disclosure, to further improve timeliness of news dissemination, merely the news from webpages in the preset field of the internet may be captured. The preset field may be set by the user based on his/her own personalized needs in advance, or may be obtained by counting the user historical browsing behaviors by the mobile device, which is not limited.

Typically, the plurality of pieces of news data obtained by capturing does not exist necessarily in the form of the briefing. The news data may be a large section of news article, or may be a review article from related parties. Therefore, in embodiments of the present disclosure, the following operations may be executed after capturing the plurality of pieces of news data.

At block S202: the plurality of pieces of news data are classified according to source information, keyword information, and semantic of news titles of the plurality of pieces of news data, to obtain a plurality of categories and a plurality of pieces of news data corresponding to each category.

The plurality of categories may be, for example, entertainment category, military category or the like.

In embodiments of the present disclosure, by classifying the plurality of pieces of news data, the determined target news category may be directly matched with one of the categories obtained through classifying, which is easy to implement. The method is executed with high efficiency, and further improves timeliness of obtaining the briefing.

At block S203: scores of each piece of news data are determined based on different dimensional parameters, to obtain a score corresponding to each piece of news data.

Alternatively, the different dimensional parameters include at least one of: news source information, news quality information, news aging information, and news length information.

At block S204: a similarity of the plurality of pieces of news data corresponding to each category is determined based on the score, and a part of news data is filtered out based on the similarity.

With the scores obtained on basis of the different dimensional parameters, the score corresponding to each piece of news data is obtained. A similarity of the plurality of pieces of news data corresponding to each category is determined according to the score, and a part of news data are filtered out according to the similarity. In this way, redundant news data can be removed effectively.

At block S205: the preset event map is generated according to the plurality of pieces of filtered news data.

By classifying the plurality of pieces of news data, a plurality of categories and the plurality of pieces of news data corresponding to each category are obtained. A part of news data are filtered out, such that the event map generated according to the filtered news data is more simplified, and more precise news briefings can be provided to the user.

At S103: a news abstract is extracted from each piece of news, to obtain a plurality of news abstracts.

In embodiments of the present disclosure, an abstract generation technology based on time sequence may be used to extract a main subject of news, to generate the news abstract with correct grammar and smooth semantics.

At S104: a part of news abstracts are selected from the plurality of news abstracts, and the briefing is generated based on the part of news abstracts.

Alternatively, in some embodiments, generating the briefing based on the part of news abstracts includes: invoking a preset template to generate the briefing according to the part of news abstracts.

The preset template may be configured in advance by the user, or may be configured in advance by ex-factory procedure of the mobile device, which is not limited.

Figure 3:
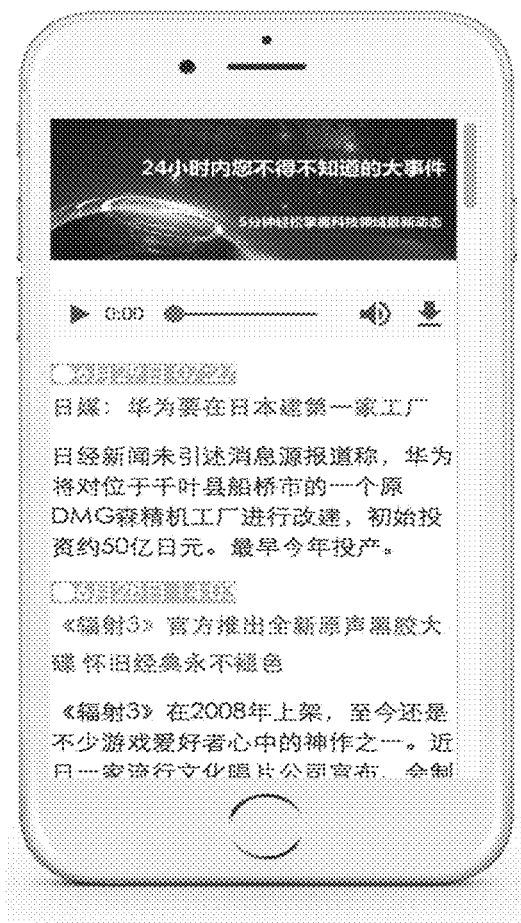
FIG. 3 is a schematic diagram illustrating a generated briefing provided by an embodiment of the present disclosure.

FIG. 3 is a schematic diagram illustrating a generated briefing provided by an embodiment of the present disclosure.

Further, alternatively, the generated briefing may be broadcasted by voice in embodiments of the present disclosure, which further improves user experience.

In embodiments, since the target news category of the user is determined according to historical accessing data of the user, then the target news category is matched with the preset event map, to obtain the plurality of pieces of news related to the target news category, and the briefing is generated based on the abstracts of plurality of pieces of news abstracts, timeliness of news dissemination may be improved and personalized reading needs for the user may be satisfied, such that user experience and commercial value of related products can be improved.

Figure 4:
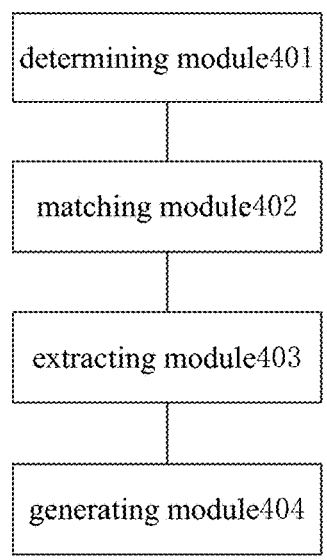
FIG. 4 is a block diagram illustrating an apparatus for generating a briefing provided by an embodiment of the present disclosure.

FIG. 4 is a block diagram illustrating an apparatus for generating a briefing provided by an embodiment of the present disclosure.

Referring to FIG. 4, the apparatus 400 includes a determining module 401, a matching module 402, an extracting module 403, and a generating module 404.

The determining module 401 is configured to determine a target news category of a user according to historical accessing data of the user;

The matching module 402 is configured to match the target news category with a preset event map, to obtain a plurality of pieces of news related to the target news category;

The extracting module 403 is configured to extract a news abstract from each news, to obtain a plurality of news abstracts;

The generating module 404 is configured to select a part of news abstracts from the plurality of news abstracts, and generating the briefing based on the part of news abstracts.

Figure 5:
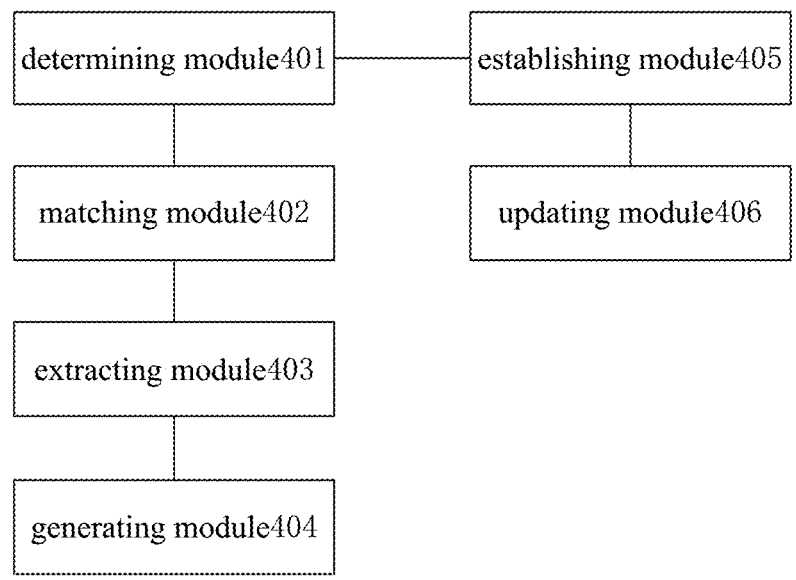
FIG. 5 is a block diagram illustrating an apparatus for generating a briefing provided by another embodiment of the present disclosure.

Alternatively, in some embodiments, referring to FIG. 5, the apparatus 400 further includes an establishing module 405 and an updating module 406.

The establishing module 405 is configured to capture news from webpages in a preset field of the internet, to obtain a plurality of pieces of news data; and to classify the plurality of pieces of news data according to source information, keyword information, and semantic of news titles of the plurality of pieces of news data, to obtain a plurality of categories and a plurality of pieces of news data corresponding to each category; to determine scores of each piece of news data based on different dimensional parameters to obtain a score corresponding to each news data, to determine a similarity of the plurality of pieces of news data corresponding to each category based on the score and filter out a part of news data based on the similarity; and to generate the preset event map according to the filtered news data.

The updating module 406 is configured to update the preset event map every preset time interval.

Alternatively, the different dimensional parameters include at least one of: news source information, news quality information, news aging information, and news length information.

Alternatively, the generating module 404 is specifically configured to: invoke a preset template to generate the briefing according to the part of news abstracts.

It should be noted that, explanation for the method for generating the briefing in the above embodiments from FIG. 1 to FIG. 3 is further suitable for the apparatus 400 for generating the briefing of this embodiment, the implementation theory is similar, which will not be elaborated here.

In embodiments, since the target news category of the user is determined according to the historical accessing data of the user, then the target news category is matched with the preset event map, to obtain the plurality of pieces of news related to the target news category, and the briefing is generated based on the abstracts of plurality of pieces of news abstracts, timeliness of news dissemination may be improved and personalized reading needs for the user may be satisfied, such that user experience and commercial value of related products can be improved.

To implement the above embodiments, the present disclosure provides a non-transitory computer readable storage medium. When instructions of the storage medium are executed by a processor of the terminal, the mobile terminal may be caused to execute a method for generating a briefing, and the method includes: determining a target news category of a user according to historical accessing data of the user; matching the target news category with a preset event map, to obtain a plurality of pieces of news related to the target news category; extracting a news abstract from each news, to obtain a plurality of news abstracts; and selecting a part of news abstracts from the plurality of news abstracts, and generating the briefing based on the part of news abstracts.

With the non-transitory computer readable storage medium in embodiments, since the target news category of the user is determined according to historical accessing data of the user, then the target news category is matched with the preset event map to obtain the plurality of pieces of news related to the target news category, and the briefing is generated based on the abstracts of plurality of pieces of news, timeliness of news dissemination may be improved and personalized reading needs for the user may be satisfied, such that user experience and commercial value of related products can be improved.

To implement the above embodiments, the present disclosure provides a computer program product. When instructions in the computer program product are executed by a processor, the processor is caused to implement a method for generating a briefing. The method includes: determining a target news category of a user according to historical accessing data of the user; matching the target news category with a preset event map, to obtain a plurality of pieces of news related to the target news category; extracting a news abstract from each news, to obtain a plurality of news abstracts; and selecting a part of news abstracts from the plurality of news abstracts, and generating the briefing based on the part of news abstracts.

With the computer program product provided in embodiments, since the target news category of the user is determined according to historical accessing data of the user; then the target news category is matched with the preset event map to obtain the plurality of pieces of news related to the target news category, and the briefing is generated based on the abstracts of plurality of pieces of news, timeliness of news dissemination may be improved and personalized reading needs for the user may be satisfied, such that user experience and commercial value of related products can be improved.

It is to be noted that, in the description of the present disclosure, the terms such as "first" and "second" are used herein for purposes of description and are not intended to indicate or imply relative importance or significance. Furthermore, "a plurality of" means two or more than two, unless specified otherwise.

Any process or method described in the flow chart or with other ways may be understood that, it represents including one or more modules, segments or portions of code configured to implement executive instructions of the steps of a particular logical function or process. And the scope of preferred embodiments of the present disclosure includes additional implementations, in which, it may not be in the order shown or discussed, including an order of a substantially simultaneous way or a converse way based on the functions involved, to execute the functions. This may be understood by the skilled in the art embodiments of the present disclosure belong to.

It should be understood that, each part of the present disclosure may be implemented with hardware, software, firmware or a combination thereof. In the above implementation, a plurality of operations or methods may be implemented with the software or the firmware which is stored in the memory and is executed by a suitable instruction execution system. For example, if the hardware is used to implement, as in another implementation, it may be implemented by any of the following technologies known in the present disclosure or combinations thereof: with configured to realize discrete logic circuits of logic gate circuits of logic function for a data signal, with a suitable application specific integrated circuit of a combinatorial logical gate circuit, a Programmable Gate Array (PGA), a Field Programmable Gate Array (FPGA) and the like.

The skilled in the art may understand that all or part of steps carried by the method of the above embodiments may be implemented by a program to instruct related hardware. The programs may be stored in a computer readable storage medium, when is executed, including one of steps of method embodiments or combinations thereof.

In addition, respective function module in respective embodiment of the present disclosure may be integrated in one processing module, and further may be that each unit physically exists separately, and further may be that two or more units are integrated in one module. The above integrate module may be implemented in the form of hardware, and further in the form of the software function module. When the integrate module is implemented in the form of the software function module and is sold or used as an independent product, it may be stored in a computer readable storage medium.

The above-mentioned storage medium may be a ROM (Read Only Memory), a magnetic disk or a CD (Compact Disk) and the like.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for generating a briefing, comprising: determining a target news category of a user according to historical accessing data of the user;
matching the target news category with a preset event map, to obtain a plurality of pieces of news related to the target news category;
extracting a news abstract from each news, to obtain a plurality of news abstracts; and selecting a part of news abstracts from the plurality of news abstracts, and generating the briefing based on the part of news abstracts
the method further comprising establishing the preset event map, comprising:
capturing news from webpages in a preset field of the internet, to obtain a plurality of pieces of news data:
classifying the plurality of pieces of news data according to source information, keyword information, and semantic of news titles of the plurality of pieces of news data, to obtain a plurality of categories and a plurality of pieces of news data corresponding to each category:
determining scores of each news data based on different dimensional parameters, to obtain a score value corresponding to each news data, the different dimensional parameters comprise news quality information, and news length information:
determining a similarity of the plurality of pieces of news data corresponding to each category based on the score value, and filtering out a part of news data based on the similarity: and
generating the preset event map according to the filtered news data.

2. The method according to claim 1, further comprising:
updating the preset event map every preset time interval.

3. The method according to claim 1, wherein, the different dimensional parameters further comprise at least one of:
news source information and news aging information.

4. The method according to claim 1, wherein, generating the briefing according to the part of news abstracts comprises:
invoking a preset template to generate the briefing according to the part of news abstracts.

5. The method according to claim 1, further comprising:
broadcasting the briefing in speech.

6. A device for generating a briefing, comprising: a processor;
a memory, stored thereon an instruction executable by the processor; wherein the processor is configured to:
determine a target news category of a user according to historical accessing data of the user;
match the target news category with a preset event map, to obtain a plurality of pieces of news related to the target news category;
extract a news abstract from each news, to obtain a plurality of news abstracts; select a part news abstracts from the plurality of news abstracts and to generate the briefing based on the part of news abstracts wherein the processor is further configured to:
capture news from webpages in a preset field of the internet, to obtain a plurality of pieces of news data:
classify the plurality of pieces of news data according to source information, keyword information, and semantic of news titles of the plurality of pieces of news data, to obtain a plurality of categories and a plurality of pieces of news data corresponding to each category;
determine scores of each news data based on different dimensional parameters to obtain a score value corresponding to each news data, the different dimensional parameters comprise news quality information, and news length information;
determine a similarity of the plurality of pieces of news data corresponding to each category based on the score value, and filter out a part of news data based on the similarity; and
generate the preset event map according to the filtered news data.

7. The device according to claim 6, wherein the processor is further configured to:
update the preset event map every preset time interval.

8. The device according to claim 6, wherein, the different dimensional parameters further comprise at least one of:
news source information and news aging information.

9. The device according to claim 6, wherein, wherein the processor is further configured to generate the briefing based on the part of news abstracts by:
  invoking a preset template to generate the briefing according to the part of news abstracts.

10. The device according to claim 6, wherein the processor is further configured to:
  broadcast the briefing in speech.

11. A non-transitory computer-readable storage medium, stored thereon computer programs that, when executed by a processor, realize the method for generating a briefing, comprising:
  determining a target news category of a user according to historical accessing data of the user;
  matching the target news category with a preset event map, to obtain a plurality of pieces of news related to the target news category;
  extracting a news abstract from each news, to obtain a plurality of news abstracts; and selecting a part of news abstracts from the plurality of news abstracts, and generating the briefing based on the part of news abstracts
  the method further comprising establishing the preset event map, comprising:
  capturing news from webpages in a preset field of the internet to obtain a plurality of pieces of news data;
  classifying the plurality of pieces of news data according to source information, keyword information, and semantic of news titles of the plurality of pieces of news data, to obtain a plurality of categories and a plurality of pieces of news data corresponding to each category;
  determining scores of each news data based on different dimensional parameters, to obtain a score value corresponding to each news data, the different dimensional parameters comprise news quality information, and news length information;
  determining a similarity of the plurality of pieces of news data corresponding to each category based on the score value, and filtering out a part of news data based on the similarity; and
  generating the preset event map according to the filtered news data.

12. The non-transitory computer-readable storage medium according to claim 11, the method further comprising:
  updating the preset event map every preset time interval.

13. The non-transitory computer-readable storage medium according to claim 11, wherein, the different dimensional parameters further comprise at least one of:
  news source information and news aging information.

14. The non-transitory computer-readable storage medium according to claim 11, wherein, generating the briefing according to the part of news abstracts comprises:
  invoking a preset template to generate the briefing according to the part of news abstracts.

15. The non-transitory computer-readable storage medium according to claim 11, the method further comprising:
  broadcasting the briefing in speech.

* * * * *